United States Patent
Klais

(10) Patent No.: US 6,457,728 B1
(45) Date of Patent: Oct. 1, 2002

(54) UPPER CONTROL ARM ADJUSTMENT SYSTEM

(75) Inventor: Matthew E Klais, Waterford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/725,992

(22) Filed: Nov. 29, 2000

(51) Int. Cl.[7] .............................................. B62D 17/00
(52) U.S. Cl. ................................ 280/86.75; 280/86.751
(58) Field of Search ....................... 280/86.75, 86.751, 280/86.752, 86.753, 86.755, 86.757, 86.758, 124.134, 124.135, 124.136, 124.137, 5.52, 5.521

(56) References Cited

U.S. PATENT DOCUMENTS

| | | | |
|---|---|---|---|
| 2,263,628 A | * 11/1941 | Hinton | ........................ 72/387 |
| 2,855,212 A | 10/1958 | Houser | |
| 3,124,370 A | 3/1964 | Traugott | |
| 4,030,737 A | 6/1977 | Bridges | |
| 4,267,896 A | 5/1981 | Hendriksen | |
| 4,313,617 A | * 2/1982 | Muramatsu et al. | ... 280/86.753 |
| 4,616,845 A | 10/1986 | Pettibone | |
| 4,635,958 A | * 1/1987 | Yonemoto | ............ 280/124.137 |
| 4,733,884 A | 3/1988 | Pettibone et al. | |
| 4,736,964 A | 4/1988 | Specktor | |
| 4,754,991 A | 7/1988 | Jordan | |
| 4,869,527 A | 9/1989 | Coddens | |
| 4,973,075 A | * 11/1990 | Rori et al. | ............. 280/86.757 |
| 5,052,711 A | 10/1991 | Pirkey et al. | |
| 5,284,353 A | 2/1994 | Shinji et al. | |
| 5,286,052 A | 2/1994 | Lukianov | |
| 5,301,977 A | 4/1994 | Schlosser et al. | |
| 5,332,255 A | 7/1994 | Velazquez | |
| 5,398,411 A | 3/1995 | Kusaka et al. | |
| 5,775,719 A | 7/1998 | Holden | |
| 5,826,894 A | 10/1998 | McDonald et al. | |
| 5,839,742 A | 11/1998 | Holt | |
| 5,967,536 A | 10/1999 | Spivey et al. | |
| 6,003,886 A | 12/1999 | Kiesel | |

* cited by examiner

*Primary Examiner*—Paul N. Dickson
*Assistant Examiner*—David R. Dunn
(74) *Attorney, Agent, or Firm*—Ralph E. Smith

(57) ABSTRACT

An upper control arm adjustment system for an automobile is described. The system includes a bracket, a pair of spaced and opposed indexing fingers located on top of the bracket, and a lever that rotates about a slot formed in the bracket. As a manipulation device is selectively rotated either clockwise or counterclockwise, the lever is rotated towards one of the indexing fingers, thus causing a bolt or cam fastened to the lever to move within the slot, thus causing the upper control arm to move either inboard or outboard with respect to the slot, thus altering the pivot position of the upper control arm.

11 Claims, 4 Drawing Sheets

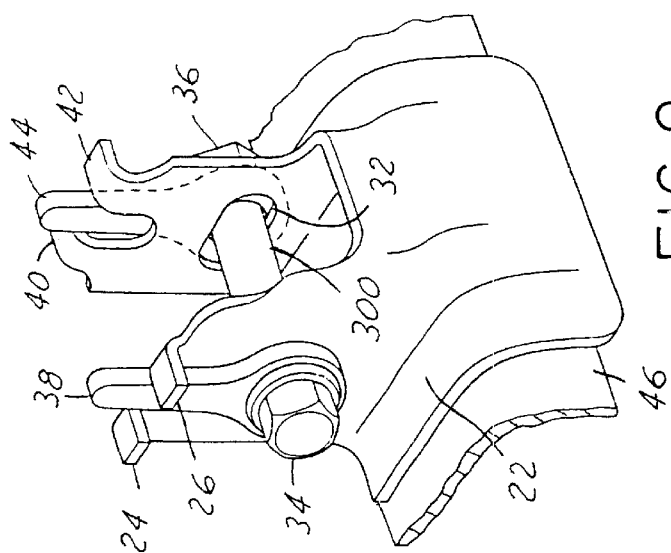
FIG. 8
(PRIOR ART)
FIG. 1
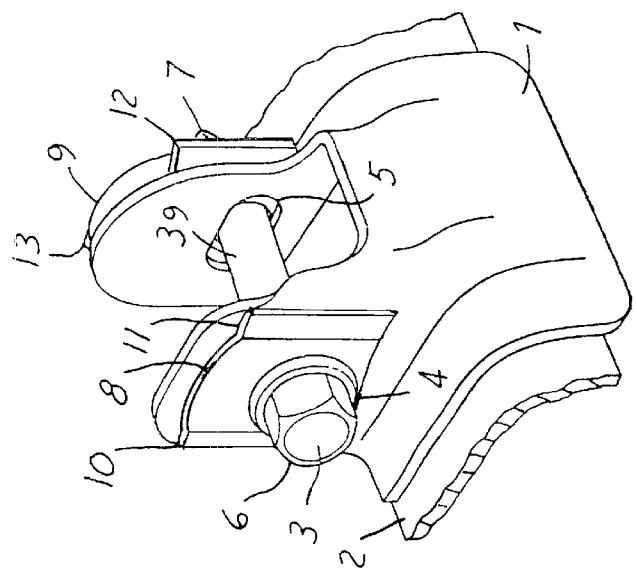
FIG. 6
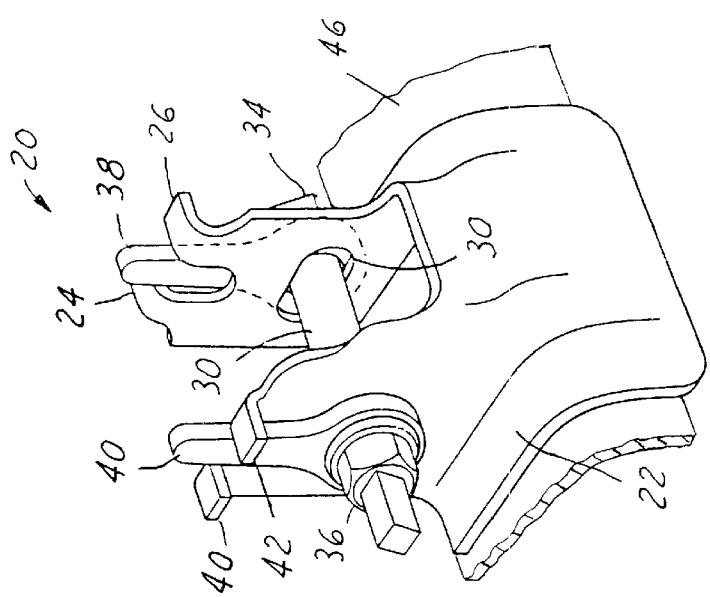

UPPER CONTROL ARM ADJUSTMENT SYSTEM

BACKGROUND OF THE INVENTION

Field of the Invention

The present invention relates generally to automobile suspension systems, and more particularly to an upper control arm adjustment system for an automobile.

BACKGROUND AND SUMMARY OF THE INVENTION

If a vehicle's axles were bolted directly to its frame or body, every rough spot in the road would transmit a jarring force throughout the vehicle. Riding would be uncomfortable, and handling at freeway speeds would be impossible. The fact that the modern vehicle rides and handles well is a direct result of a suspension system.

Even though the tires and wheels must follow the road contour, the body should be influenced as little as possible. The purpose of any suspension system is to allow the vehicle to travel forward with a minimum amount of up-and-down movement. The suspension should also permit the vehicle to make turns without excessive body roll or tire skidding.

As part of a conventional suspension system, all vehicles have either control arms or struts to keep the wheel assembly in the proper position. The control arms (i.e., upper and lower) and struts allow the wheel to move up and down while preventing it from moving in any other direction. The wheel will tend to move in undesirable directions whenever the vehicle is accelerated, braked, or turned. Vehicle suspensions may have control arms only or a combination of control arms and struts.

Typically, control arms are generally configured in a V-shape design with a pair of pivot arms (i.e., front and rear attachment points) pivotally mounted to a surface of the vehicle frame with brackets and associated bushings, with the apex of the control arm being mounted to the spindle via a ball joint, or like assembly. The front and rear attachment points pivot on the rubber bushings. The attachment points absorb the tendency of the control arm to move forward and rearward as the wheel moves. The control arm design keeps the wheel from moving inward and outward.

By designing the upper and lower control arms carefully, it is possible to have a suspension system that allows the wheel to move up and down while causing it to remain in the straight up and down position. The upper and lower control arms move through different arcs, keeping the outer pivot points in alignment. This improves handling over bumps.

Accordingly, it is necessary to ensure that the pivot points remain in proper alignment or else the suspension system performance can be compromised. Typically, the alignment is accomplished through adjusting the position of the control arm relative to its respective bracket.

A more complete description of suspension systems in general, and adjustment systems for the various components of suspension systems in particular, can be found in the following U.S. patents, the entire disclosures of which are incorporated herein by reference:

U.S. Pat. No. 2,855,212 to Houser discloses independently suspending the axles of a vehicle on rubber torsion springs while providing for independent adjustment of the spring means.

U.S. Pat. No. 3,124,370 to Traugott discloses automotive vehicles of the type wherein the front wheels are independently suspended from the vehicle frame, these types of assemblies generally employing upper and lower control arms, which are pivotally connected at their inner ends to the vehicle frame, the outer ends of the control arms supporting the wheel spindle assembly.

U.S. Pat. No. 4,616,845 to Pettibone discloses a toe adjustment assembly for adjusting the toe in the rear wheels of a vehicle having an independent rear suspension including: a cam device operatively associated with a lateral control arm, a slot provided in fixed relationship with the vehicle frame, and, cam engaging surfaces associated with the slot.

U.S. Pat. No. 4,736,964 Specktor discloses an apparatus for guarding against accidental displacement of two members of an automotive vehicle, after an adjustment of an alignment characteristic has been made, involving the use of cams which are used to adjust the alignment characteristic and which have prongs which are pressed into the adjacent surfaces of a member of the suspension system.

U.S. Pat. No. 4,754,991 to Jordan discloses a method and buffer apparatus for preventing corrosion in a dynamic load bearing assembly.

U.S. Pat. No. 4,869,527 to Coddens discloses a vehicle wheel alignment device for adjusting the camber of a wheel carried at one end of a lateral suspension member, such as an I-beam of a twin I-beam suspension.

U.S. Pat. No. 5,052,711 to Pirkey et al. discloses a method and apparatus for factory pre-aligning vehicle wheels and for subsequently realigning the vehicle wheels after usage and for verifying such re-alignment.

U.S. Pat. No. 5,284,353 to Shinji et al. discloses an independent suspension for use in a front wheel or a rear wheel of an automobile.

U.S. Pat. No. 5,286,052 to Lukianov discloses a double wishbone suspension system for a motor vehicle which achieves reduced roll center movement and wheel camber change relative to the vehicle body in jounce and rebound of the vehicle wheels throughout their suspension travel while requiring minimal packaging space.

U.S. Pat. No. 5,301,977 to Schlosser et al. discloses an adjustment system for providing toe and/or camber adjustment for a normally fixed wheel of a vehicle using a plate member, in conjunction with portions of the structures of the suspension system of the vehicle, to locate at least one center point for the formation of new aligned openings so that a portion of the control system may be moved from an original location and secured at a new location to provide for the toe and/or camber adjustment.

U.S. Pat. No. 5,332,255 to Velazquez discloses a heavy duty front suspension system especially for passenger buses includes square rubber torque springs supported by a spring frame assembly.

U.S. Pat. No. 5,775,719 to Holden discloses a control arm adjustment mechanism including a frame bracket connected to a vehicle frame with a bolt extending through the frame bracket.

U.S. Pat. No. 5,826,894 to McDonald et al. discloses a toe adjustment assembly including a frame and a pair of lateral links pivotally mounted to the frame. A bore is formed in at least one of the links.

U.S. Pat. No. 5,839,742 to Holt discloses a suspension system with a contained force system which concentrates loads in the suspension geometry control elements.

U.S. Pat. No. 5,967,536 to Spivey et al. discloses a system and method for converting stock MacPherson strut suspension systems for a host automobile to a double A-arm type of suspension system using only stock or pre-existing mounting locations and only ordinary hand tools.

U.S. Pat. No. 6,003,886 to Kiesel discloses a rear lateral arm for lowering the body of a vehicle which includes a mechanism which can be adjusted to compensate for the excessive negative camber associated with such lowering.

An example of a conventional upper control arm adjustment system is shown in FIG. 1, and is exemplary of the type of system used on the lower control arm of the 1999 model TOYOTA TUNDRA truck. In this view, a bracket 1 is mounted upon a portion of the vehicle's frame 2 for receiving one of the attachment points of the lower control arm (not shown). In order to secure the lower control arm to bracket 1, a bolt 3 is placed through a pair of openings 4, 5, provided on the bracket 1. Typically, the bolt 3 is received in a bushing 3a. A pair of nuts 6, 7, respectively, when tightened against the bracket 1 secure bolt 3 within the confines of the pair of openings 4, 5. In order to adjust the pivot point of the lower control arm, a pair of rotatable cams 8, 9 are provided on the outer surfaces of the bracket 1, with the bolt 3 extending through openings (not shown) provided on the pair of cams 8, 9. When manipulated, the pair of cams 8, 9 permit the relative movement of the bushing 3a within the pair of openings or slots 4, 5, thus allowing for the adjustment of the pivot axis of the lower control arm. On both sides of the pair of cams 8, 9 are a set of paired cam guides 10, 11, 12, 13, respectively, which are typically welded to the frame 2. The pair of cams 8, 9 are centered between the cam guides 10, 11, 12, 13, respectively. Thus, when the pair of cams 8, 9 are turned during an adjustment operation, the bushing 3a moves in a cross-car (i.e., inboard-outboard) direction in the pair of slots 4, 5, respectively, thus changing the relative position of the lower control arm with respect to the bracket 1 so as to enable the establishment of the proper pivot axis of the lower control arm.

Although this system has aided somewhat in facilitating the adjustment of control arms in general, it has several disadvantages. Initially, the packaging area for this type of system is relatively large. Second, it is rather labor-intensive to weld the individual cam guides onto the bracket, thus increasing manufacturing costs as well as the chances for defects, such as weld failures and misalignment. Third, the opening or slot location is dependent on the location of the cam guides, thus inviting potential errors in design and manufacturing to occur.

Therefore, there exists a need for an upper control arm adjustment system that is inexpensive to manufacture, simple to operate, and is easily integrated into the vehicle's suspension system.

Accordingly, at least one of the objects of the present invention is to provide such an upper control arm adjustment system.

In accordance with one embodiment of the present invention, an upper control arm adjustment system for an automobile suspension system is provided, comprising:
 a bracket member, the bracket member having an area defining an aperture, the bracket member having a pair of spaced and opposed finger members extending upwardly away from the aperture;
 a position adjustment member rotatably received in the aperture; and
 a lever member connected to the position adjustment member;
 wherein when the lever member is moved in a first direction the position adjustment member moves to a first position relative to the aperture;
 wherein when the lever member is moved in a second direction the position adjustment member moves to a second position relative to the aperture.

In accordance with another embodiment of the present invention, an upper control arm adjustment system for an automobile suspension system is provided, comprising:
 a bracket member, the bracket member having an area defining an aperture, the bracket member having a pair of spaced and opposed finger members extending upwardly away from the aperture;
 a position adjustment member rotatably received in the aperture; and
 a lever member connected to the position adjustment member;
 wherein when the lever member is moved in a first direction the lever member contacts at least one of the pair of finger members so as to cause the position adjustment member to move to a first position relative to the aperture;
 wherein when the lever member is moved in a second direction the lever member contacts at least one of the pair of finger members so as to cause the position adjustment member to move to a second position relative to the aperture.

In accordance with still another embodiment of the present invention, an upper control arm adjustment system for an automobile suspension system is provided, comprising:
 a first bracket member, the first bracket member having an area defining an aperture, the first bracket member having a pair of spaced and opposed finger members extending upwardly away from the aperture;
 a first position adjustment member rotatably received in the aperture;
 a first lever member connected to the position adjustment member;
 wherein when the first lever member is moved in a first direction the first position adjustment member moves to a first position relative to the aperture of the first bracket member;
 wherein when the first lever member is moved in a second direction the first position adjustment member moves to a second position relative to the aperture of the first bracket member;
 a second bracket member, the second bracket member having an area defining an aperture, the second bracket member having a pair of spaced and opposed finger members extending upwardly away from the aperture;
 a second position adjustment member rotatably received in the aperture; and
 a second lever member connected to the second position adjustment member;
 wherein when the second lever member is moved in a first direction the second position adjustment member moves to a first position relative to the aperture of the second bracket member;
 wherein when the second lever member is moved in a second direction the second position adjustment member moves to a second position relative to the aperture of the second bracket member.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from the detailed description.

BRIEF DESCRIPTION OF THE DRAWINGS

The present invention will become more fully understood from the detailed description and the accompanying drawings, wherein:

FIG. 1 is a partial perspective view of an upper control arm adjustment system, in accordance with the prior art;

FIG. 6 is a partial perspective view of the upper control arm adjustment system depicted in FIG. 5, in accordance with one embodiment of the present invention.

FIG. 8 is a partial perspective view of the upper control arm adjustment system depicted in FIG. 7, in accordance with an alternative embodiment of the present invention.

The same reference numerals refer to the same parts throughout the various Figures.

DETAILED DESCRIPTION OF THE PREFERRED EMBODIMENTS

Although the present invention is directed primarily to an upper control arm adjustment system, it should be noted that the present invention can be practiced with any number of different types of mechanisms and assemblies which require the adjustment of pivot points and relative positions.

The present invention proposes a new and improved upper control arm adjustment system that replaces the conventional cam and cam guide system with a lever/indexing finger system.

Figure 2:
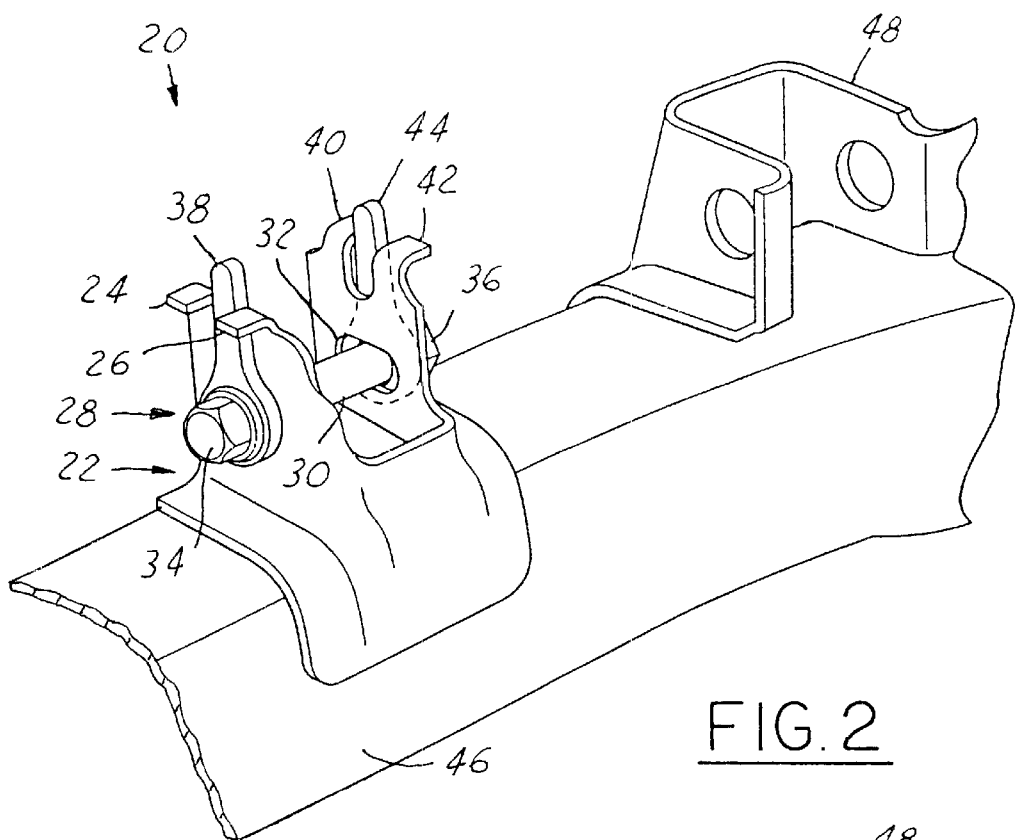
FIG. 2 is a partial perspective view of an upper control arm adjustment system, in accordance with one embodiment of the present invention.

Referring to FIG. 2, there is shown an upper control arm adjustment system 20, in accordance with one embodiment of the present invention. The system 20 includes a bracket member 22, a pair of spaced and opposed indexing fingers 24, 26, respectively, and a position adjustment system 28. The position adjustment system 28 includes an elongated member 30, such as a bolt, which extends through an aperture or slot 32 formed in the bracket member 22, a manipulation member 34 for rotating the elongated member 30 relative to the slot 32, a locking member 36 (e.g., a nut) for ensuring that the elongated member 30 does not fall out of the slot 32, and a lever member 38 which enables the elongated member 30 to move relative to the slot 32 when the manipulation member 34 is rotated. Preferably, the bracket member is provided with a second pair of spaced and opposed indexing fingers 40, 42, respectively, and a second lever member 44. The bracket member 22 is preferably mounted to a frame member 46 of the automobile.

Preferably, the system 20, includes a second bracket member 48, with identical characteristics as the first bracket member 22, as well as a second position adjustment system (not shown). Although not shown in this view, it will be appreciated that one attachment point of an upper control arm would be rotatably connected to the bolt 30, with the other attachment point of the upper control arm being rotatably connected to the bolt (not shown) of the second bracket member 48.

In operation, the manipulation member 34 is selectively rotated either clockwise or counterclockwise in order to adjust the position of the bolt 30 relative to the slot 32. By rotating the manipulation member 34, the lever members 38 and 44 will contact indexing fingers 24, 26, 40, 42, respectively, thus causing the bolt to either move inboard or outboard with respect to the slot 32, depending on the direction of rotation.

Figure 3:
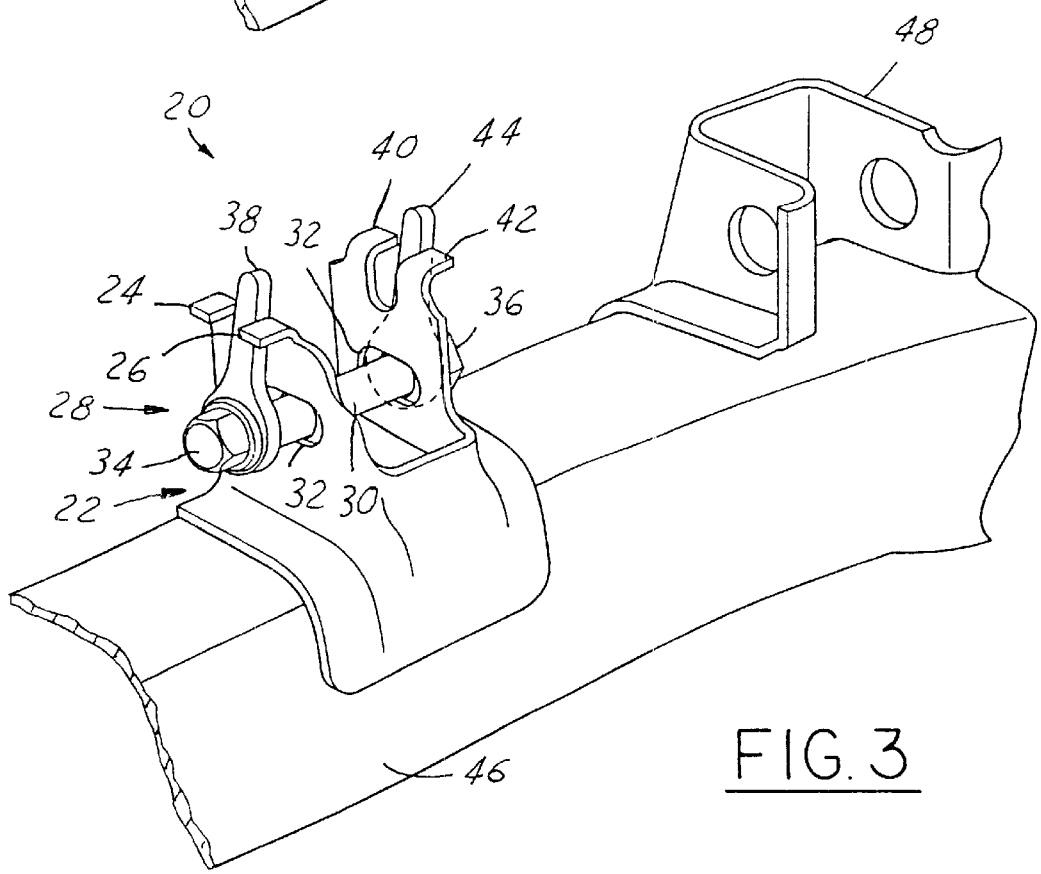
FIG. 3 is a partial perspective view of the upper control arm adjustment system depicted in FIG. 2, with the bolt in its full positive caster position (i.e., full inboard position), in accordance with one embodiment of the present invention.

Referring to FIG. 3, the bolt 30 is shown in its full positive caster position (i.e., full inboard position) which was caused by rotating the manipulation member in a clockwise position, thus causing lever members 38 and 44 to contact indexing fingers 26 and 42, respectively, which in turn caused the bolt 30 to move relative to the slot 32 to the position shown.

Figure 4:
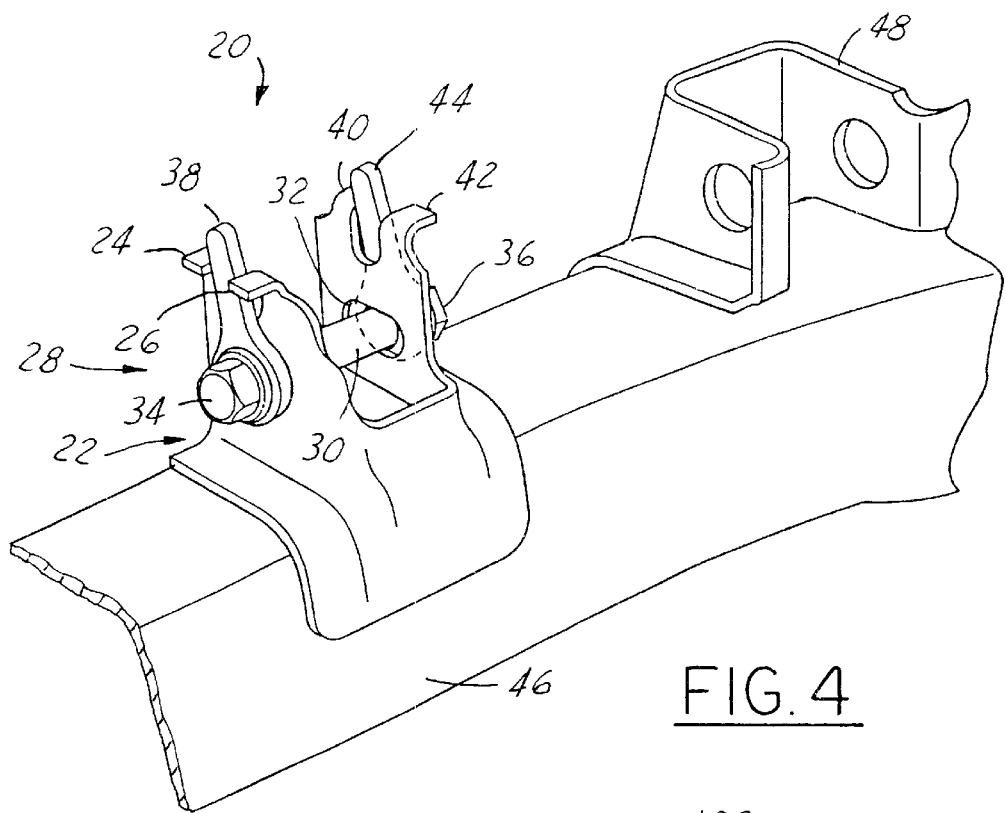
FIG. 4 is a partial perspective view of the upper control arm adjustment system depicted in FIG. 2, with the bolt in its full negative caster position (i.e., full outboard position), in accordance with one embodiment of the present invention.

Referring to FIG. 4, the bolt 30 is shown in its full negative caster position (i.e., full outboard position) which was caused by rotating the manipulation member in a counterclockwise position, thus causing lever members 38 and 44 to contact indexing 10 fingers 24 and 40, respectively, which in turn caused the bolt 30 to move relative to the slot 32 to the position shown.

Figure 5:
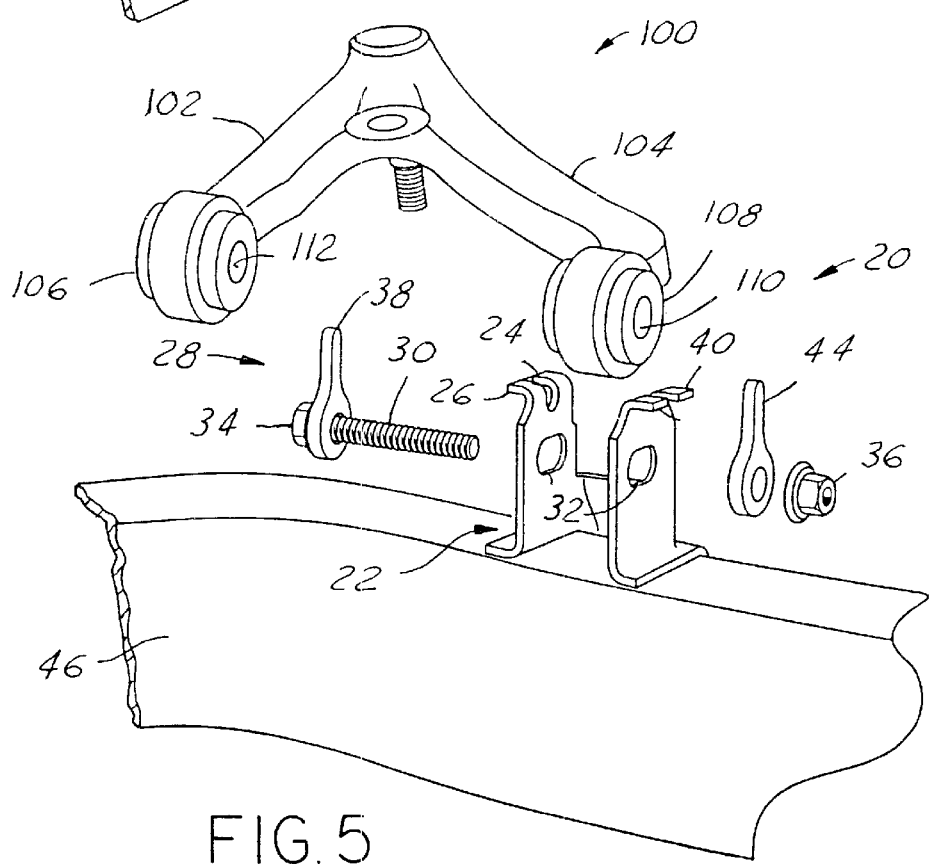
FIG. 5 is an exploded view of an upper control arm adjustment system, in accordance with one embodiment of the present invention.

Referring to FIG. 5, there is shown an exploded view of an upper control arm adjustment system, in accordance with one embodiment of the present invention. In this view, an upper control arm 100 is shown in proximity to the upper control arm attachment system 20. The upper control arm typically includes two arms 102, 104, respectively, terminating in two attachment points 106, 108 respectively. The attachment points 106, 108 typically have slots 110, 112, respectively, for receiving various structures, such as elongated members. Although only one bracket member 22 is shown, it should be noted that typically each attachment point of the control arm is associated with its own individual bracket member.

With respect to assembly, attachment point 108 is lowered into the interior portion of bracket member 22 so at to align slot 110 with slots 32. Once this is accomplished, bolt 30, through which lever 38 is received, is then threaded through slots 32 and slot 110 and then through lever 44 whereupon a locking member 36 (e.g., a locking nut) is then secured to the distal end of bolt 30 so as to secure the upper control arm 100 to the upper control arm adjustment system 20. To adjust the pivot point of the upper control arm 100, the locking member 36 is loosened slightly and the manipulation member 34 is turned either clockwise or counterclockwise so as to cause levers 38 and/or 44 to contact indexing fingers 24, 26, 40, 42, respectively, which then causes bolt 30 to move within slots 32 so as to change the relative position of bolt 30 with respect to slots 32. In this manner, the pivot point of the upper control arm 100 can be adjusted.

Referring to FIG. 6, there is shown a partial perspective view of the upper control arm adjustment system depicted in FIG. 5, in accordance with one embodiment of the present invention. However, in this view, the system 20 is shown in its fully assembled state, with the attachment point of the upper control arm removed for purposes of clarity.

Figure 7:
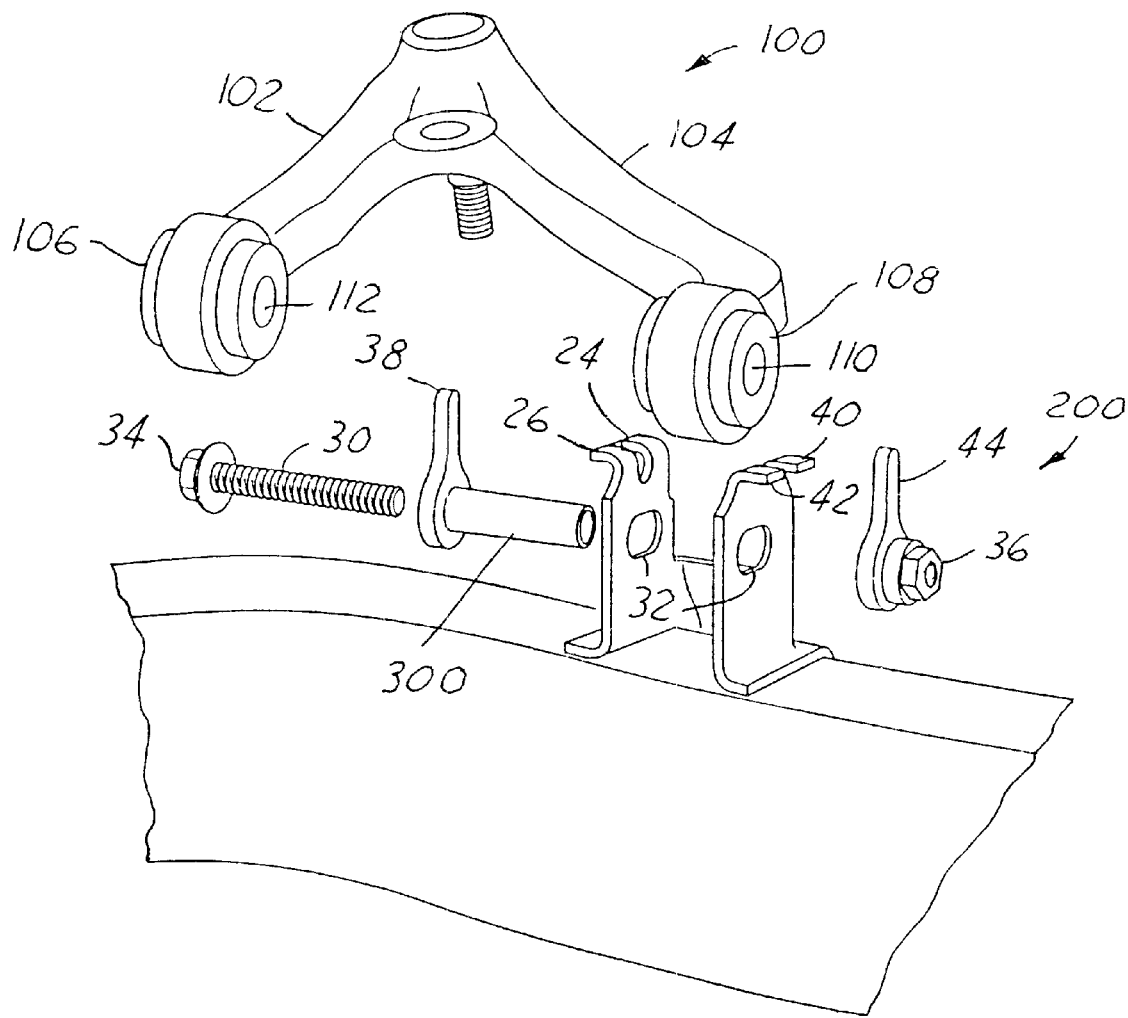
FIG. 7 is an exploded view of an upper control arm adjustment system, in accordance with an alternative embodiment of the present invention.

Referring to FIG. 7, there is shown an exploded view of an upper control arm adjustment system 200, in accordance with an alternative embodiment of the present invention.

The primary difference between this embodiment and the embodiment depicted in FIG. 5 is the use of a cam device 300. In practice, the bolt 30 is received in the cam device 300. However, the operation of the alternative system 200 as a whole is substantially the same as previously described. Therefore, in this case, it is actually the cam device 300 that is moved relative to the slots 32, whereupon the change in the pivot point of the upper control arm is accomplished.

Referring to FIG. 8, there is shown a partial perspective view of the upper control arm adjustment system depicted in FIG. 7, in accordance with an alternative embodiment of the present invention. However, in this view, the system 200 is shown in its fully assembled state, with the attachment point of the upper control arm removed for purposes of clarity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An upper control arm adjustment system for an automobile suspension system, comprising:
   a bracket member, the bracket member having an area defining an aperture, the bracket member having a pair of spaced and opposed finger members extending upwardly away from the aperture;
   a position adjustment member rotatably received in the aperture; and
   a lever member connected to the position adjustment member and extending between the pair of spaced and opposed finger members;
   wherein when the lever member is moved in a first direction the position adjustment member moves relative to the aperture;
   wherein when the lever member is moved in a second direction the position adjustment member moves relative to the aperture in a direction opposite the direction it moves when the lever member is moved in the first direction.

2. The invention according to claim 1, further comprising a second pair of spaced and opposed finger members and a second lever member connected to the position adjustment member and extending between the second pair of spaced and opposed finger members.

3. The invention according to claim 1, wherein the position adjustment member comprises an elongated cylindrical member.

4. The invention according to claim 1, further comprising an upper control arm member rotatably connected to the position adjustment member.

5. An upper control arm adjustment system for an automobile suspension system, comprising:
   a bracket member, the bracket member having an area defining an aperture, the bracket member having a pair of spaced and opposed finger members extending upwardly away from the aperture;
   a position adjustment member rotatably received in the aperture; and
   a lever member connected to the position adjustment member and extending between the pair of spaced and opposed finger members;
   wherein when the lever member is moved in a first direction the lever member contacts at least one of the pair of finger members so as to cause the position adjustment member to move to a first position relative to the aperture;
   wherein when the lever member is moved in a second direction the lever member contacts at least one of the pair of finger members so as to cause the position adjustment member to move to a second position relative to the aperture.

6. The invention according to claim 5, further comprising a second pair of spaced and opposed finger members and a second lever member connected to the position adjustment member and extending between the second pair of spaced and opposed finger members.

7. The invention according to claim 5, wherein the position adjustment member comprises an elongated cylindrical member.

8. The invention according to claim 5, further comprising an upper control arm member rotatably connected to the position adjustment member.

9. An upper control arm adjustment system for an automobile suspension system, comprising:
   a first bracket member, the first bracket member having an area defining a first aperture, the first bracket member having a first pair of spaced and opposed finger members on radially opposed sides of the first aperture extending upwardly away from the first aperture;
   a first position adjustment member rotatably received in the first aperture;
   a first lever member connected to the position adjustment member and extending between the first pair of spaced and opposed fingers;
   wherein when the first lever member is moved in a first direction the first position adjustment member moves to a first position relative to the first aperture of the first bracket member;
   wherein when the first lever member is moved in a second direction the first position adjustment member moves to a second position relative to the first aperture of the first bracket member;
   a second bracket member, the second bracket member having an area defining a second aperture, the second bracket member having a second pair of spaced and opposed finger members on radially opposed sides of the second aperture extending upwardly away from the second aperture;
   a second position adjustment member rotatably received in the aperture; and
   a second lever member connected to the second position adjustment member and extending between the second pair of spaced and opposed fingers;
   wherein when the second lever member is moved in a first direction the second position adjustment member moves to a first position relative to the second aperture of the second bracket member;
   wherein when the second lever member is moved in a second direction the second position adjustment member moves to a second position relative to the second aperture of the second bracket member.

10. The invention according to claim 9, wherein the first and second position adjustment members comprise an elongated cylindrical member.

11. The invention according to claim 9, further comprising an upper control arm member rotatably connected to the first and second position adjustment members.

* * * * *